Sept. 27, 1938.  B. MISHELEVICH  2,131,386
GROUND DETECTING APPARATUS
Filed Sept. 28, 1935  2 Sheets-Sheet 1

INVENTOR
Benjamin Mishelevich.
BY
HIS ATTORNEY

INVENTOR
Benjamin Mishelevich.
BY
HIS ATTORNEY

Patented Sept. 27, 1938

2,131,386

UNITED STATES PATENT OFFICE 2,131,386

GROUND DETECTING APPARATUS

Benjamin Mishelevich, Pittsburgh, Pa., assignor to The Union Switch & Signal Company, Swissvale, Pa., a corporation of Pennsylvania Application September 28, 1935, Serial No. 42,697

6 Claims. (Cl. 177—311)

My invention relates to ground detecting apparatus and more specifically to apparatus for the detection of grounds in direct current and alternating current transmission systems.

I will describe several forms of ground detecting apparatus embodying my invention, and will then point out the novel features thereof in claims.

Figure 1:
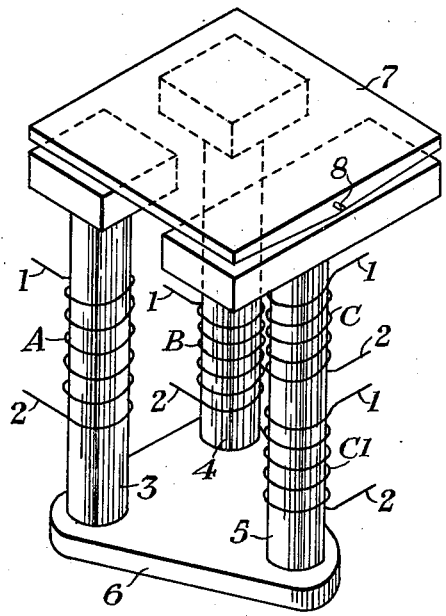
Figure 2:
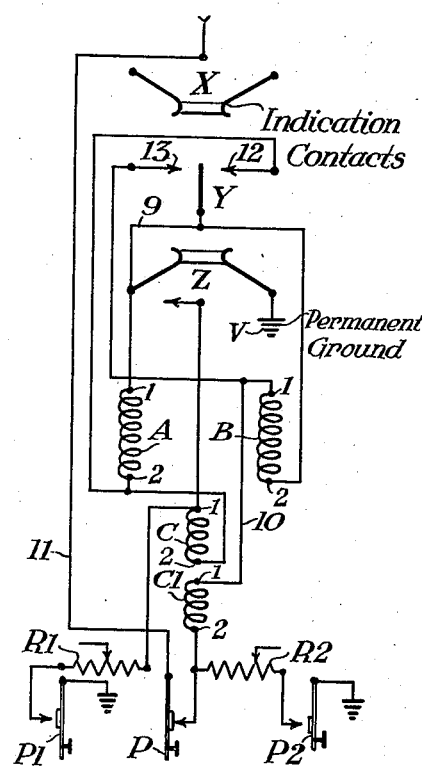
Figure 3:
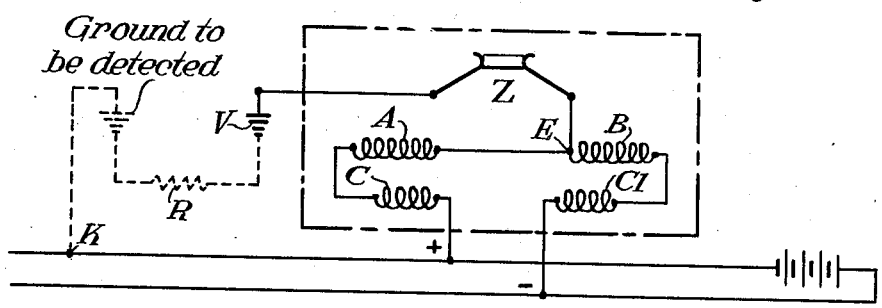
Figure 4:
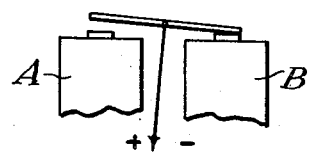
Figure 5:
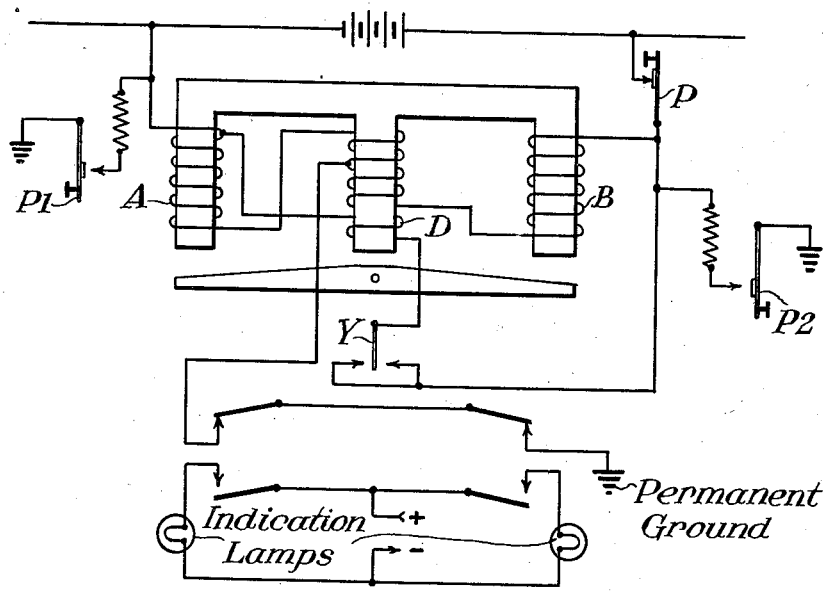
Figure 6:
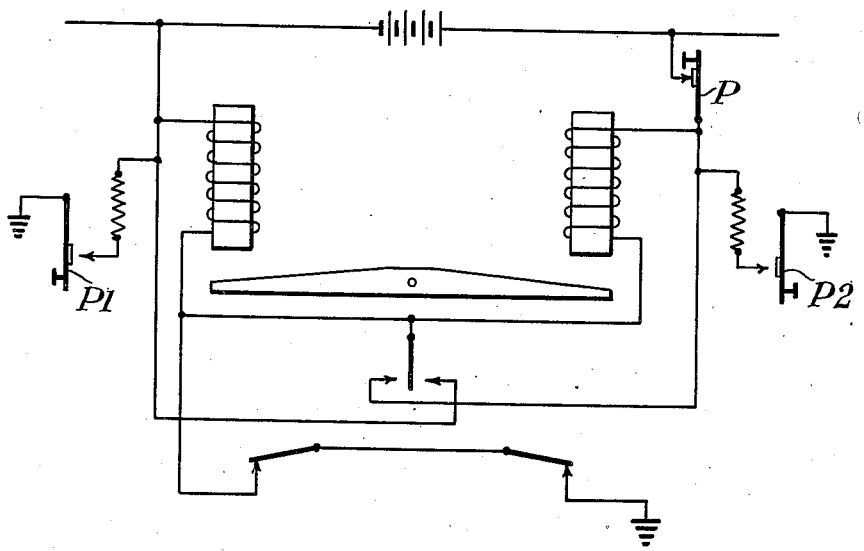

Fig. 1 of the accompanying drawings is a diagrammatic view showing the magnetic structure and the arrangement of windings in one form of ground detecting apparatus embodying my invention. Fig. 2 is a diagrammatic view showing a ground detecting system employing the magnetic structure of Fig. 1, and also embodying my invention. Fig. 3 is a diagrammatic view which is used in explaining the operation of the detecting apparatus. Fig. 4 shows a detail of the indicating apparatus of the ground detector. Figs. 5 and 6 are diagrammatic views showing modified forms of the ground detecting apparatus of Figs. 1 and 2, also embodying my invention.

Similar reference characters refer to similar parts in each of the several views.

Referring to Fig. 1 of the drawings, I have shown a three-legged magnetic structure comprising the cores 3, 4 and 5 which are joined together at one end by a magnetizable backstrap 6. An armature 7, pivoted at 8, completes the magnetic circuits for cores 3—5 and 4—5, respectively. Armature 7 is normally biased in any suitable manner as, for example, by means of contact or buffer springs or a counterweight to assume a neutral or balanced position in which it does not engage either of the cores 3 or 4. The windings A, B, C, and C1 are normally energized with current from the transmission line or source which the apparatus is designed to protect and the number of turns as well as the resistance of these windings are so chosen that the pull on armature 7 due to the flux set up by windings A and C is substantially equal and opposite to the pull set up by windings B and C1. In order to produce aiding fluxes in the common portion of the magnetic structure, terminal 2 of winding A is connected to terminal 2 of winding C. Similarly, terminal 1 of winding B is connected with terminal 1 of winding C1. The interconnection of the four windings will be clear from the diagram of Fig. 2, in which the terminals of the respective windings are numbered to correspond with Fig. 1.

Referring now to Fig. 2, it will be noted that with the apparatus in the normal condition as indicated in this figure, all of the windings are connected in series across the battery terminals. The energizing circuit for these windings extends from the plus terminal, windings C and A, wire 9, windings B and C1, push button P, and wire 11, to the minus battery terminal. It will be apparent, therefore, that when neither side of the battery or transmission line is grounded, the tractive forces on both sides of the armature will be equal and the armature will stay in the middle position in which the contact at Z will be closed and the contacts at Y will both be open. The contacts at Y act to short-circuit coil A or coil B when the armature is attracted to its right-hand or left-hand position, respectively, thus sticking the armature in the operated position until such time as the restoring push button P is depressed by the operator to release the armature.

One terminal of contact Z is permanently connected with ground at V for a purpose which will become clear as the description of the operation of the apparatus progresses. The operation of contacts Z and Y is of the continuity transfer type such that contact Y will close before contact Z opens. Indication contacts are provided at X for controlling any suitable apparatus to indicate the presence of a ground on the system. The resistors R1 and R2, in conjunction with push buttons P1 and P2, are provided for the purpose of enabling the operator to determine the magnitude of the resistance of a ground occurring on the system. In place of the indication contacts X, or in addition thereto, the armature 7 may be provided with a pointer, as indicated in Fig. 4, thus giving a visual indication of a ground on the system. The relative position assumed by the pointer shows whether the ground is on the negative or positive battery terminal or transmission wire.

The operation of the apparatus of Figs. 1 and 2 will be best understood with reference to Fig. 3. In this figure, the dotted rectangle encloses the detecting apparatus itself for purposes of clarity, and a ground is shown at K, on the positive side of the battery. When such a ground occurs, a circuit is completed through the resistance R of the ground, by way of the permanent ground connection at V, and through contact Z of the relay, to point E. As will be apparent from the diagram, the ground path just traced acts to shunt out coils A and C of the relay. Consequently, less current will flow through these coils and, in addition, more current will flow through the coils B and C1 because of the multiple path provided by the ground circuit. The result is that the armature will become unbalanced and will be pulled down toward the right, in Fig. 4, thus causing the pointer to swing to the left, and indicating a ground on the positive wire of the system.

When the above armature movement takes place, contact Y (in Fig. 2) will close in its right-hand position, thus placing a direct shunt across coil A which insures that the armature will remain attracted even though the duration of the ground was very short. At the same time, the permanent ground circuit through V will become opened at contact Z. The apparatus will continue to remain in its unbalanced condition until the armature is restored to its normal balanced position by the manipulation of push button P. It is not essential that the permanent ground at V be connected to the relay windings at the particular point indicated in the drawings, although the connection shown is probably the most effective. Obviously, this ground may be connected at any suitable point in the coils A, B, C, or C1, and when so connected, a ground on the system will cause current to be by-passed around at least a portion of one of the coils, with an attendant increase in the current in the remaining coils, thus unbalancing the armature and providing an indication of the ground.

In restoring the apparatus, the attendant first depresses push button P which removes all current from the relay coils and permits the armature to return to its balanced or middle position. If, after releasing the restoring button, the ground indication returns, the fact is established that the ground continues to be effective. If, on the other hand, the armature remains in its middle position after the restoring button is released, it must be assumed that the ground was either of intermittent character or that it is present on a branch circuit which is not energized at the time. A negative ground will be detected in an analogous manner and it is believed unnecessary to explain in detail the operation of the apparatus for this condition.

In order to insure that the ground detecting apparatus is at all times operative, push buttons P1 and P2 are provided so that artificial positive or negative grounds can be placed, whenever desired, on the respective wire of the transmission circuit. If, after push button P1 or P2 is depressed, the armature does not move from its balanced position, a defect in the apparatus itself is indicated. Use is made of the resistors R1 and R2 connected in series with the checking push buttons to determine the resistance of the ground. The ohmic value of a ground which can be detected with the apparatus is roughly proportional to the voltage of the transmission line. For example, if the apparatus is furnished for a 10-volt direct current circuit, grounds of the order of 2500 ohms can be detected. In a 16-volt circuit, grounds of the order of 4000 ohms can be detected and at higher voltages this value may be as high as 40,000 ohms. It should be understood, of course, that these values are merely explanatory and are not intended as limitations on the operating range of the apparatus.

The resistance of the ground being detected can be determined by manipulating certain of the push buttons and making a comparison with the value of the resistor R1 or R2. For example, let it be assumed that there is a ground on the positive side of the battery and that the battery voltage is 10 volts, in which case the resistor R1 would be of the order of 2000 ohms, in one particular embodiment of the invention. This ground will be indicated by the pointer of Fig. 4 moving to the left where it indicates "+." As explained hereinbefore, the pointer will remain in its indicating position because of the stick circuit which is completed through contact Y. The steps to be followed in determining the value of the ground resistance, assuming a positive ground, are as follows. First, depress the negative ground check button P2 to connect negative battery to ground through the resistor R2. Next, keeping P2 depressed, push in the restoring button P to remove battery from all coils so that the armature will return to the middle position. Then, continuing to maintain the negative check button depressed, release the restoring button and note the position assumed by the pointer. If the detector needle points to negative, it is apparent that the positive ground is more than 2000 ohms. If the needle points to positive, the value of the positive ground is less than 2000 ohms. Whereas, if the needle remains in the central position, it may be concluded that the value of the positive ground is approximately 2000 ohms. It will be understood, of course, that these values are illustrative only. The approximate magnitude of a ground on the negative side of the battery can be determined in a similar manner by manipulating the restoring and positive check buttons P and P1. If desired, the resistors R1 and R2 can be made adjustable through a suitable range determined by the sensitivity of the apparatus, whereby manipulation of the resistor adjustment in conjunction with the steps described above will permit a range of ground resistance values to be measured with suitable accuracy. In the case of an A. C. transmission line, the resistors R1 and R2 may be replaced with suitable reactors or condensers.

Referring now to Fig. 5, the apparatus disclosed therein is similar to that of Figs. 1 and 2 with the exception that a holding winding D is provided on the common core of the two magnetic circuits, and the function of contact Y is somewhat different. It will be noted that when the armature of Fig. 5 operates to one or the other position as a result of a ground on the system, contact Y closes and connects the holding winding D across the battery terminals. In this manner, even though neither of the windings A or B is short-circuited, the holding flux established by winding D is sufficient to maintain the armature in its operated position until such time as the operator depresses the restoring button to interrupt the current flow in the holding winding. In Fig. 5, I have also shown how separate ground indication lamps may be connected into the detector relay circuit to provide a distinctive indication of a positive or negative ground, which indication may take the place of, or be additional to, the indication which is provided by the pointer in Fig. 4.

The apparatus shown in Fig. 6 is essentially the same as the apparatus of Figs. 1 and 2 with the exception that I have provided independent magnetic circuits for the two parts of the relay structure, thus dispensing with the common core 5 of Fig. 1. Obviously, the relay cores of Fig. 6 can be of the usual U-shape, although shown diagrammatically in the form of a straight bar.

Although I have shown electromagnetic circuits for the detector relay suitable for energization by direct current, it will be apparent that my invention can be applied to ground detection on alternating current circuits by suitably changing the magnetic structure of the detector relay and making other suitable changes obvious to those skilled in the art.

From the above description it will be apparent that I have provided a highly efficient and sensitive ground detecting device which not only detects the presence of a ground but also makes it possible to determine the magnitude of the ground occurring on the system and to obtain a check on the operativeness of the system.

Although I have herein shown and described only a few forms of ground detecting apparatus embodying my invention, it is understood that various changes and modifications may be made therein within the scope of the appended claims without departing from the spirit and scope of my invention.

Having thus described my invention, what I claim is:

1. A ground detector comprising, in combination, two balanced magnetic circuits each having a magnetizing winding connected across a source of current, an armature normally occupying a neutral position due to the balanced condition of said magnetic circuits, a connection from one of said windings to ground for establishing a ground path around at least a portion of one winding in the event that a terminal of said source becomes grounded thus unbalancing said magnetic circuits to cause operation of said armature, a normally ineffective impedance which is at times connected so as to by-pass current around one of said windings for determining the resistance of the ground on said source, means for restoring said armature to its neutral position following the occurrence of a ground, and means for connecting said impedance so as to by-pass current from one of said windings to thereby oppose the effect of the unbalanced torque on the armature and to provide a measure of the resistance of said ground.

2. A ground detector comprising, in combination, two balanced magnetic circuits each having a magnetizing winding connected across a source of current, an armature normally occupying a neutral position due to the balanced condition of said magnetic circuits, a connection from one of said windings to ground for establishing a ground path around at least a portion of one winding in the event that a terminal of said source becomes grounded thus unbalancing said magnetic circuits to cause operation of said armature, a normally ineffective impedance which is at times connected so as to by-pass current around one of said windings for determining the resistance of the ground on said source, means effective once said armature is operated for maintaining an unbalance between said magnetic circuits to maintain the armature in its operated position, means for restoring said armature to its neutral position following the occurrence of a ground, and means for connecting said impedance so as to by-pass current from one of said windings to thereby oppose the effect of the unbalanced torque on the armature and to provide a measure of the resistance of said ground.

3. A ground detector comprising, in combination, two balanced magnetic circuits, an energizing winding for each of said circuits connected across a source of current, an armature controlled by said magnetic circuits and normally occupying a balanced position, a connection from one of said windings to ground for establishing a ground path around at least a portion of one winding in the event that a terminal of said source becomes grounded thus unbalancing said armature, means effective when said armature becomes unbalanced for subsequently maintaining the armature in the unbalanced position, a normally ineffective impedance which is at times connected so as to by-pass current around one of said windings for determining the resistance of the ground on said source, means for restoring said armature to its balanced position following the occurrence of a ground, and means for connecting said impedance so as to by-pass current from one of said windings to thereby oppose the effect of the unbalanced torque on the armature and to provide a measure of the resistance of said ground.

4. A ground detecting system comprising, in combination, a pair of transmission wires connected with a source of current, a detecting relay comprising a balanced armature operated on by substantially equal and opposite magnetic forces, windings connected with said transmission wires for developing said opposed forces, a connection from one of said windings to ground whereby if a ground occurs on one of said transmission wires said forces will become unequal and said armature will move from its balanced position to thereby indicate the presence of said ground, a normally ineffective grounding impedance connected with one of said windings and at times effective for by-passing current around said last-named winding for determining the resistance of said ground, means for restoring said armature to its balanced position following the occurrence of a ground, and means for connecting said impedance so as to by-pass current from one of said windings to thereby oppose the effect of the unbalanced torque on the armature and to provide a measure of the resistance of said ground.

5. A ground detector comprising, in combination, two balanced magnetic circuits each having an independent core portion and a core portion common to the two magnetic circuits, an armature normally occupying a balanced position as a result of the balanced condition of said magnetic circuits, a first operating winding on the independent core portion of one magnetic circuit, a second operating winding on the independent core portion of the other magnetic circuit, a combined operating and holding winding on said common core portion of the two magnetic circuits, means including a source of current for energizing all three of said windings in series, a connection from one of said two operating windings to ground for establishing a ground path around at least a portion of said one winding in the event that a terminal of said source becomes grounded thus unbalancing said armature, and means effective when the armature becomes unbalanced for shunting the turns of said one winding to thereby maintain the armature in its unbalanced condition due to the joint effect of said second winding and said combined operating and holding winding.

6. A ground detector comprising, in combination, two balanced magnetic circuits each having an independent core portion and a core portion common to the two magnetic circuits, an armature normally occupying a balanced position as a result of the balanced condition of said magnetic circuits, a first operating winding on the independent core portion of one magnetic circuit, a second operating winding on the independent core portion of the other magnetic circuit, a combined operating and holding winding on said common core portion of the two magnetic circuits, means including a source of current for energizing all three of said windings in series, a connection from one of said two operating windings to ground for establishing a ground path around at least a portion of said one winding in the event that a terminal of said source becomes grounded thus unbalancing said armature, and means effective when the armature becomes unbalanced for decreasing the energy in said one winding to thereby maintain the armature in its unbalanced condition due to the joint effect of said second winding and said combined operating and holding winding.

BENJAMIN MISHELEVICH.